US006031911A

United States Patent [19]
Adams et al.

[11] Patent Number: 6,031,911
[45] Date of Patent: Feb. 29, 2000

[54] PRACTICAL S BOX DESIGN

[75] Inventors: Carlisle M. Adams, Ottawa; Serge J. M. Mister, Amherstview, both of Canada

[73] Assignee: Entrust Technologies, Ltd., Ottawa, Canada

[21] Appl. No.: 08/895,875

[22] Filed: Jul. 17, 1997

Related U.S. Application Data

[60] Provisional application No. 60/021,983, Jul. 18, 1996.

[51] Int. Cl.$^7$ ...................................................... H04K 1/00
[52] U.S. Cl. .................................. 380/29; 380/37; 380/46
[58] Field of Search .................................. 380/29, 37, 46

[56] References Cited

U.S. PATENT DOCUMENTS

| | | |
|---|---|---|
| 5,003,597 | 3/1991 | Merkle . |
| 5,317,639 | 5/1994 | Mittenthal ................................ 380/37 |
| 5,351,299 | 9/1994 | Matsuzaki et al. . |
| 5,511,123 | 4/1996 | Adams ..................................... 380/29 |
| 5,778,074 | 7/1998 | Garcken et al. .......................... 380/37 |
| 5,796,837 | 8/1998 | Kim et al. ................................. 380/28 |

OTHER PUBLICATIONS

A. Youseff, On the Linear Approximation of Injective S–boxes, Department of Electrical and Computer Engineering Queen's University, Kingston, Ontario, Canada, pp. 1–5.

A. Youseff, S. Tavares, S. Mister, C. Adams, Linear Approximation of Injective S–Boxes, Electronics Letters, vol. 31, Dec. 1995, pp. 2165–2166.

C. M. Adams, Constructing Symmetric Ciphers Using the CAST Design Procedure, Designs, Codes and Cryptography, Kluwer Academic Publishers, Boston, 1997, pp. 283–316.

C. M. Adams, Designing DES–Like Ciphers with Guaranteed Resistance to Differential and Linear Attacks, Workshop Record of the Workshop on Selected Areas in Cryptography (SAC 95), May 18–19, 1995, pp. 133–144.

C. M. Adams and S. E. Tavares, Generating and Counting Binary Bent Sequences, IEEE Transactions on Information Theory, vol. IT–36, 1990, pp. 1170–1173.

E. Biham, On Matsui's Linear Cryptanalysis, Advances in Cryptology—Proceedings of Eurocrypt '94, Springer–Verlag, Berlin, 1995, pp. 341–355.

E. Biham and A. Shamir, Differential Cryptanalysis of DES–Like Cryptosystems, Advances in Cryptology: Proceedings of CRYPTO '90, Springer–Verlag, Berlin, 1991, pp. 1–21.

J. F. Dillon, A Survey of Bent Functions, NSA Technical Journal, Special Issue, 1972, pp. 191–215.

K. Nyberg, Perfect Nonlinear S–Boxes. Advances in Cryptology—Proceedings of Eurocrypt '91, Springer–Verlag, Berlin, 1991, pp. 378–385.

B. Preneel, W. Van Leekwijck, L. Van Linden, R. Govaerts, and J. Vandewalle, Propagation characteristics of boolean functions, Advances in Cryptology: Proceedings of Eurocrypt '90, Springer–Verlag, Berlin, 1991, pp. 161–173.

A. F. Webster and S. E. Tavares, On the Design of S–Boxes, Advances in Cryptology; Proceedings of CRYPTO '85, Springer–Verlag, New York, 1986, pp. 523–534.

*Primary Examiner*—David Cain
*Attorney, Agent, or Firm*—Markison & Reckamp, P.C.

[57] ABSTRACT

A method of generating a substitution box (S-box) involves generating an S-box with desired characteristics, forming a new S-box with another column such that the new S-box has the desired characteristics as well, and continuing to add columns in these ways until the S-box has the proper size.

27 Claims, 8 Drawing Sheets

AN 8 X 32 S-BOX, M

```
30fb40d4 9fa0ff0b 6beccd2f 3f258c7a 1e213f2f 9c004dd3 6003e540 cf9fc949
bfd4af27 88bbbdb5 e2034090 98d09675 6e63a0e0 15c361d2 c2e7661d 22d4ff8e
28683b6f c07fd059 ff2379c8 775f50e2 43c340d3 df2f8656 887ca41a a2d2bd2d
a1c9e0d6 346c4819 61b76d87 22540f2f 2abe32e1 aa54166b 22568e3a a2d341d0
66db40c8 a784392f 004dff2f 2db9d2de 97943fac 4a97c1d8 527644b7 b5f437a7
b82cbaef d751d159 6ff7f0ed 5a097a1f 827b68d0 90ecf52e 22b0c054 bc8e5935
4b6d2f7f 50bb64a2 d2664910 bee5812d b7332290 e93b159f b48ee411 4bff345d
fd45c240 ad31973f c4f6d02e 55fc8165 d5b1caad a1ac2dae a2d4b76d c19b0c50
882240f2 0c6e4f38 a4e4bfd7 4f5ba272 564c1d2f c59c5319 b949e354 b04669fe
b1b6ab8a c71358dd 6385c545 110f935d 57538ad5 6a390493 e63d37e0 2a54f6b3
3a787d5f 6276a0b5 19a6fcdf 7a42206a 29f9d4d5 f61b1891 bb72275e aa508167
38901091 c6b505eb 84c7cb8c 2ad75a0f 874a1427 a2d1936b 2ad286af aa56d291
d7894360 425c750d 93b39e26 187184c9 6c00b32d 73e2bb14 a0bebc3c 54623779
64459eab 3f328b82 7718cf82 59a2cea6 04ee002e 89fe78e6 3fab0950 325ff6c2
81383f05 6963c5c8 76cb5ad6 d49974c9 ca180dcf 380782d5 c7fa5cf6 8ac31511
35e79e13 47da91d0 f40f9086 a7e2419e 31366241 051ef495 aa573b04 4a805d8d
548300d0 00322a3c bf64cddf ba57a68e 75c6372b 50afd341 a7c13275 915a0bf5
6b54bfab 2b0b1426 ab4cc9d7 449ccd82 f7fbf265 ab85c5f3 1b55db94 aad4e324
cfa4bd3f 2deaa3e2 9e204d02 c8bd25ac eadf55b3 d5bd9e98 e31231b2 2ad5ad6c
954329de adbe4528 d8710f69 aa51c90f aa786bf6 22513f1e aa51a79b 2ad344cc
7b5a41f0 d37cfbad 1b069505 41ece491 b4c332e6 032268d4 c9600acc ce387e6d
bf6bb16c 6a70fb78 0d03d9c9 d4df39de e01063da 4736f464 5ad328d8 b347cc96
75bb0fc3 98511bfb 4ffbcc35 b58bcf6a e11f0abc bfc5fe4a a70aec10 ac39570a
3f04442f 6188b153 e0397a2e 5727cb79 9ceb418f 1cacd68d 2ad37c96 0175cb9d
c69dff09 c75b65f0 d9db40d8 ec0e7779 4744ead4 b11c3274 dd24cb9e 7e1c54bd
f01144f9 d2240eb1 9675b3fd a3ac3755 d47c27af 51c85f4d 56907596 a5bb15e6
580304f0 ca042cf1 011a37ea 8dbfaadb 35ba3e4a 3526ffa0 c37b4d09 bc306ed9
98a52666 5648f725 ff5e569d 0ced63d0 7c63b2cf 700b45e1 d5ea50f1 85a92872
af1fbda7 d4234870 a7870bf3 2d3b4d79 42e04198 0cd0ede7 26470db8 f881814c
474d6ad7 7c0c5e5c d1231959 381b7298 f5d2f4db ab838653 6e2f1e23 83719c9e
bd91e046 9a56456e dc39200c 20c8c571 962bda1c e1e696ff b141ab08 7cca89b9
1a69e783 02cc4843 a2f7c579 429ef47d 427b169c 5ac9f049 dd8f0f00 5c8165bf
```

FIG 3
(prior art)

PRACTICAL S BOX DESIGN

CROSS-REFERENCE TO RELATED APPLICATIONS

This application claims the benefit of U.S. Provision application Ser. No. 60/021,983, filed Jul. 18, 1996.

BACKGROUND OF THE INVENTION

The present invention relates generally to cryptographic methods and systems to be used in digital data processing, and in particular, is directed to methods and systems for constructing large substitution boxes for use in improving the security of symmetric block ciphers.

There are two general types of key-based cryptographic algorithms: asymmetric, also known as public-key, and symmetric. Public-key algorithms are designed so that the key used to decrypt the message is different from that used to encrypt the message. The encryption keys may be made public because the decryption key cannot be calculated from the encryption key. By contrast, in symmetric algorithms, the encryption key and decryption keys are either the same or may be calculated from one another.

There are two types of symmetric algorithms: stream ciphers and block ciphers. Stream ciphers operate on data one bit at a time while block ciphers operate on blocks of data where each block can be as large as 64 bits or more. The U.S. government standard Data Encryption Standard (DES) is one example of a symmetric block algorithm that encrypts using 64-bit blocks.

The security of a cryptosystem depends on its ability to mask the unavoidable redundancies in the underlying plaintext to make it impossible or computationally infeasible for an interloper to recreate it from the ciphertext. Confusion and diffusion are two general methods of obscuring redundancies. Good block ciphers will perform a number of bit-for-bit substitutions to introduce confusion. Diffusion is obtained by transposing, or rearranging the order of, the bits of the plaintext or ciphertext. Block ciphers typically employ successive iterations of both confusion and diffusion. Each iteration, or "round," contains both substitution and permutation.

Many block ciphers are based on Feistel networks because the underlying mathematical principles of Feistel networks guarantee that the cipher will be invertible. Both DES and the Northern Telecom-developed cipher, CAST, are examples of Feistel network-based ciphers.

FIGS. 1 and 2 are flow diagrams of the DES enciphering process. As shown in FIG. 1, DES is a typical Feistel network. To start, the algorithm takes a block of 64 bits and, after a permutation, divides the block into two equal-length halves. The cipher then performs a set of iterations where the output of the ith round is determined from the output of the previous round. In particular, $$L_i = R_{i-1}$$

$$R_i = L_{i-1} \oplus f(R_{i-1}, K_{i-1})$$

In each iteration, one of the halves, in this case the right half R, is input to a round function that also takes as input an internal key, K. In FIG. 1, the round function is indicated by $f_1, f_2, \ldots f_n$ (in DES, $f_1 = f_2 = \ldots = f_{16}$).

FIG. 2 illustrates round function, f. Round function f takes two inputs, the right half R of the block and an internal key K (Step 220). Right half R is expanded to 48 bits (Step 222) and XORed with K (Step 224). The result is divided into 8 parts and each 6-bit section is input to one of eight different substitution boxes, or S-boxes (Step 226). An m×n S-box is simply a mapping of m input bits to n output bits, and may be implemented in hardware or software. In the DES process, each S-box is a nonlinear substitution, mapping 6 input bits into 4 output bits. The eight outputs of the S-boxes are concatenated (Step 228) and then permuted (Step 230).

Unauthorized persons will attempt to exploit cryptosystems such as DES using mathematical analytic attacks, such as differential and linear cryptanalysis. Differential cryptanalysis looks at pairs of plaintext blocks and their corresponding ciphertext blocks and constructs a table of possible input versus output differences. The resulting table, called an XOR table, may indicate characteristics that can lead to the key in use. Linear cryptanalysis is a cryptanalytic attack that uses linear approximations to compute the key bits. The attack uses S-box approximations and is very successful against S-boxes that have low nonlinearity.

Much of the security of block ciphers based on Feistel networks depends on the properties of the S-boxes used in the round function. Generally, the larger the S-box, the better the security of the block cipher. Although S-boxes may be nonlinear, S-boxes that are not carefully designed to exhibit certain ideal properties may generate a skewed distribution of XOR outputs for given XOR inputs, making them susceptible to differential cryptanalysis. For more information on the relationship between the distribution of output XORs and susceptibility to differential cryptanalysis, see Carlisle M. Adams, "On immunity against Biham and Shamir's Differential Cryptanalysis," Information Processing Letters, vol. 41, Feb. 14, 1992, pp. 77–80.

Many scientists in the field have studied what theoretical operational properties S-boxes should have in order to be relatively resistant to cryptanalytic attack. Some scientists, for example, have proposed that an ideal S-box would have all entries in the XOR table equal to 0 or 2. See E. Biham and A. Shamir, "Differential Cryptanalysis of DES-like Cryptosystems," Advances in Cryptology: Proceedings of CRYPTO '90, Springer-Verlag, Berlin, 1991, pp. 1–21.

Other scientists have proposed that ideal S-boxes satisfy what is called "strict avalanche criterion" (SAC). See A. F. Webster and S. E. Tavares, "On the Design of S-boxes", Advances in Cryptology: Proceedings of CRYPTO '85, Springer-Verlag, New York, 1986, pp. 523–34 S-boxes algorithms that satisfy the strict avalanche criterion produce output bits that change with a probability of one half whenever a single input bit is complemented.

FIG. 3 shows a sample representation to illustrate the size and format of an S-box as known in the art. An m×n S-box may be represented as a $2^m \times n$ binary matrix, M, where each column is a binary vector which corresponds to a Boolean function of the m input variables, and which defines the response of a single output bit to any given input. Row i of M, $1 \leq i \leq 2^m$ is therefore the n-bit output vector that results from the ith input vector. An S-box with good avalanche properties would be one in which the sum (modulo 2) of any pair of rows in M would be approximately half zeros and half ones.

Furthermore, scientists have discovered that if bent function-based columns are used for columns of an S-box, the S-box will behave in an "ideal" fashion with respect to avalanche properties. Any change in the m input bits will cause each of the n output bits to change with probability ½. A column of M is considered bent if the normalized resultant vector of a two-dimensional Walsh-Hadamard transform of the binary column has all its coefficients either +1 or −1. The Walsh-Hadamard transform is a binary analog of the Fourier transform.

A very large number of known binary vectors may be used to construct the S-box matrix, M. It has been further proposed that if all linear combinations of S-box columns are also bent, the S-box will be more resistant to linear cryptanalytic attacks. See E. Biham, "On Matsui's Linear Cryptanalysis", Advances in Cryptology-Proceedings of EUROCRYPT '94, Springer-Verlag, Berlin, 1995, pp. 341–355.

In general, an ideal S-box would possess the following properties:

I1. All linear combinations of S-box columns are bent;

I2. All entries in the S-box XOR table are 0 or 2;

I3. The S-box satisfies a maximum order strict avalanche criterion;

I4. The S-box satisfies a maximum order bit independence criterion;

I5. The weights of rows has a binomial distribution with mean n/2;

I6. The weights of all pairs of rows has a binomial distribution with mean n/2; and I7. The columns are each of Hamming weight $2^{n-1}$. (The Hamming weight is the number of 1s in a binary vector).

As mentioned earlier, S-boxes that have property I1 will be more resistant to linear cryptanalysis. S-boxes having property I2 would be protected against differential cryptanalysis. Properties I1, I5, and I7 help to ensure a good static characteristic which means that for any particular input, the output appears to have been randomly generated. Properties I2, I3, I4, and I6 help to ensure a good dynamic characteristic, meaning that as one of the inputs is changed, the change in the resulting output appears random. Not all of these properties, however, can be achieved simultaneously.

Although these properties have been studied extensively, relatively little work has been done to determine to what degree these properties are achievable in practice. Block ciphers that currently need large S-boxes often use random S-boxes rather than constructed S-boxes because the methods of construction of S-boxes traditionally have been computationally slow to implement. Furthermore, many scientists in the field believe that it would be difficult to construct S-boxes using specific mathematical techniques that would result in S-boxes that exhibited random-like properties. For this reason, existing systems typically generate random S-boxes and test them for the desired properties. This method is likewise computationally inefficient (particularly for large S-boxes).

It is therefore desirable to increase the security of existing ciphers that use S-boxes by constructing S-boxes with ideal characteristics rather than using randomly generated S-boxes.

In addition, it is desirable to construct an S-box that is resistant to known cryptanalytic attacks.

It is further desirable to provide a method of constructing an S-box with as many as possible of the "ideal" characteristics mentioned above.

It is still further desirable to reduce the processing time to construct S-boxes with ideal characteristics.

To meet these desires, a method consistent with this invention begins with an S-box smaller than desired but having certain characteristics. That S-box is augmented to form a larger S-box with those same characteristics, and this augmentation repeats until a S-box of the proper size is formed.

SUMMARY OF THE INVENTION

More specifically, a method consistent with the present invention of generating a substitution box (S-box) capable of receiving m inputs and producing n outputs, where m and n are positive integers greater than 1, comprises the steps of selecting desired operational characteristics for the target S-box and generating a first S-box having m inputs and having k outputs, wherein k is less than n and greater than 1. The method also includes the steps of performing iterations of (a) generating a column of m inputs; (b) determining the operational characteristics of a temporary S-box formed by the first S-box and the column; and (c) modifying the first S-box by appending the column if the temporary S-box possesses the desired operational characteristics. The method continues until the temporary S-box reaches the desired size.

According to another aspect of the invention, a method of generating an m×n substitution box (S-box), where m and n are positive integers greater than 1, comprises the steps of selecting a desired level nonlinearity, NL, for the m×n S-box; generating a first S-box having m inputs and k outputs, wherein k is less than n and greater than 1; generating a first column, $C_1$, of length m; performing a first operational test using column $C_1$; performing a second operational test using column $C_1$; generating a second column, $C_2$, of length m; performing the first operational test using column $C_2$; performing the second operational test using column $C_2$; determining $X_1$, the XOR of $C_1$ and $C_2$, if $C_1$ and $C_2$ both pass the first operational test and fail the second operational test; performing the first operational test using $X_1$; replacing the kth column of the first S-box with $C_1$ and appending $C_2$ to the first S-box as the k+1st column, if $X_1$ passes the first operational test; incrementing k by 1; and repeating the steps for generating and testing columns until k equals n.

BRIEF DESCRIPTION OF THE DRAWINGS

The accompanying drawings, which are incorporated in and constitute a part of this specification, illustrate the invention and together with the description, serve to explain the principles of the invention.

FIG. 3 illustrates a format and size of an 8×32 S-box, whose format and size is known in the art.

DESCRIPTION OF THE PREFERRED EMBODIMENTS

Reference will now be made in detail to preferred implementations that are consistent with the present invention, an example of which is illustrated in the accompanying drawings.

Figure 1:
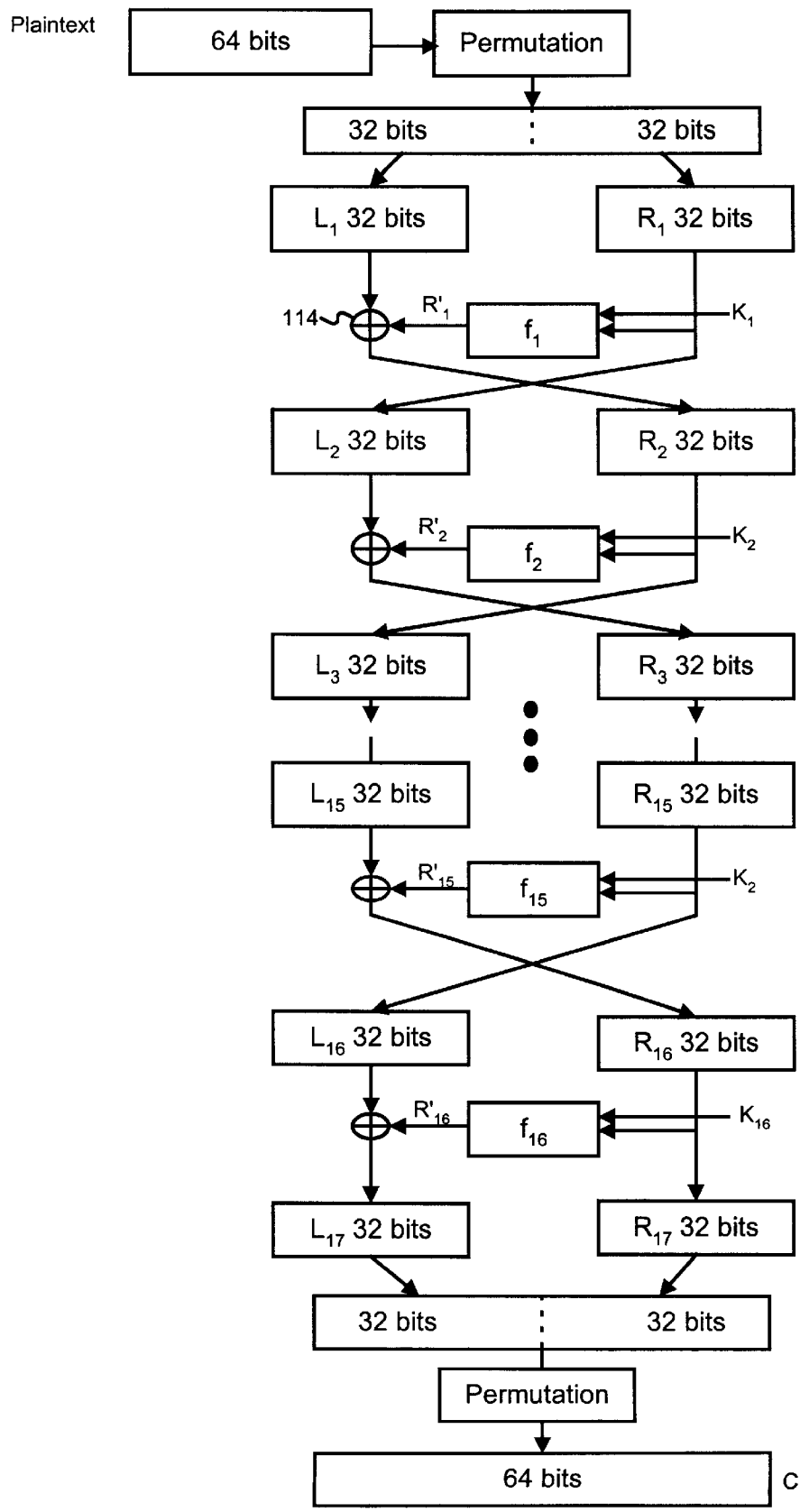
FIG. 1 is a flow chart of the known DES encryption process.
Figure 2:
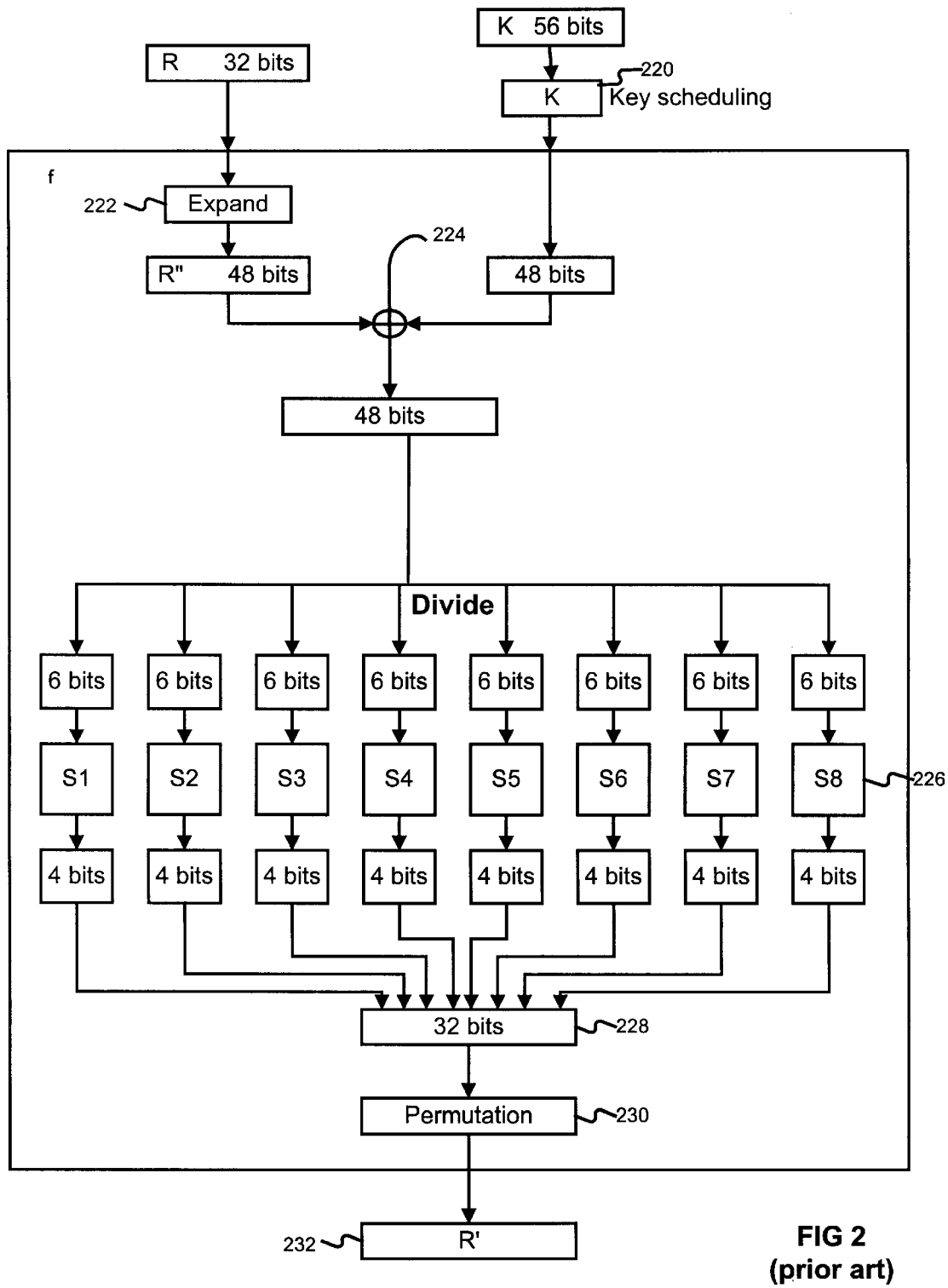
FIG. 2 is a schematic diagram illustrating in detail a round function of the DES encryption process shown in FIG. 1.
Figure 4A:
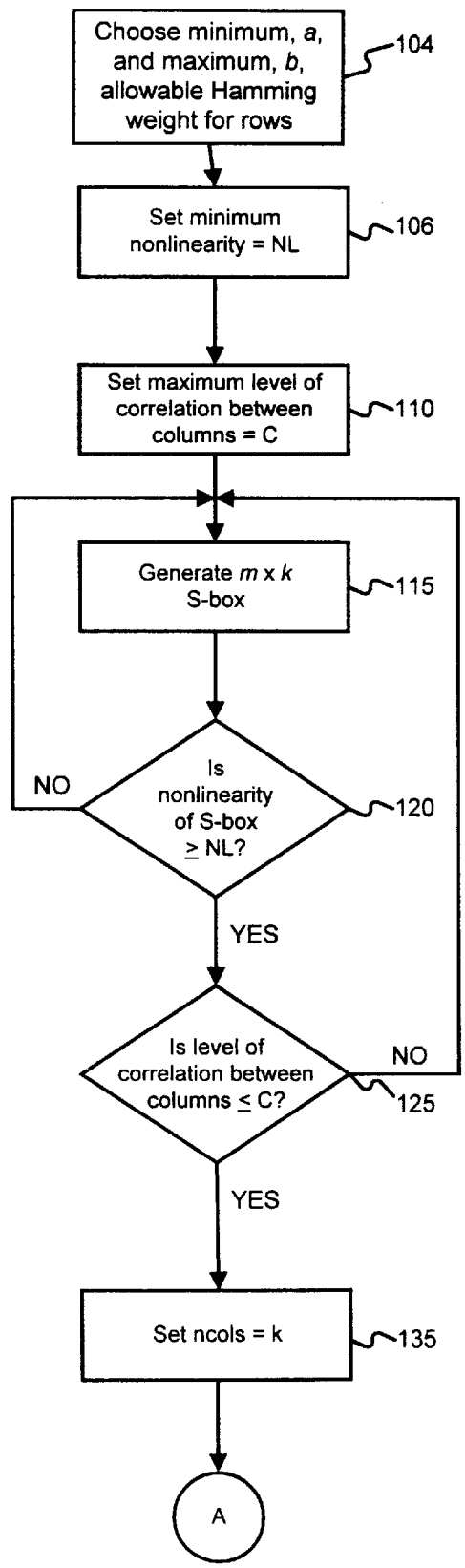
FIGS. 4A–C contain a flow chart of a method of constructing m×n S-boxes.
Figure 4B:
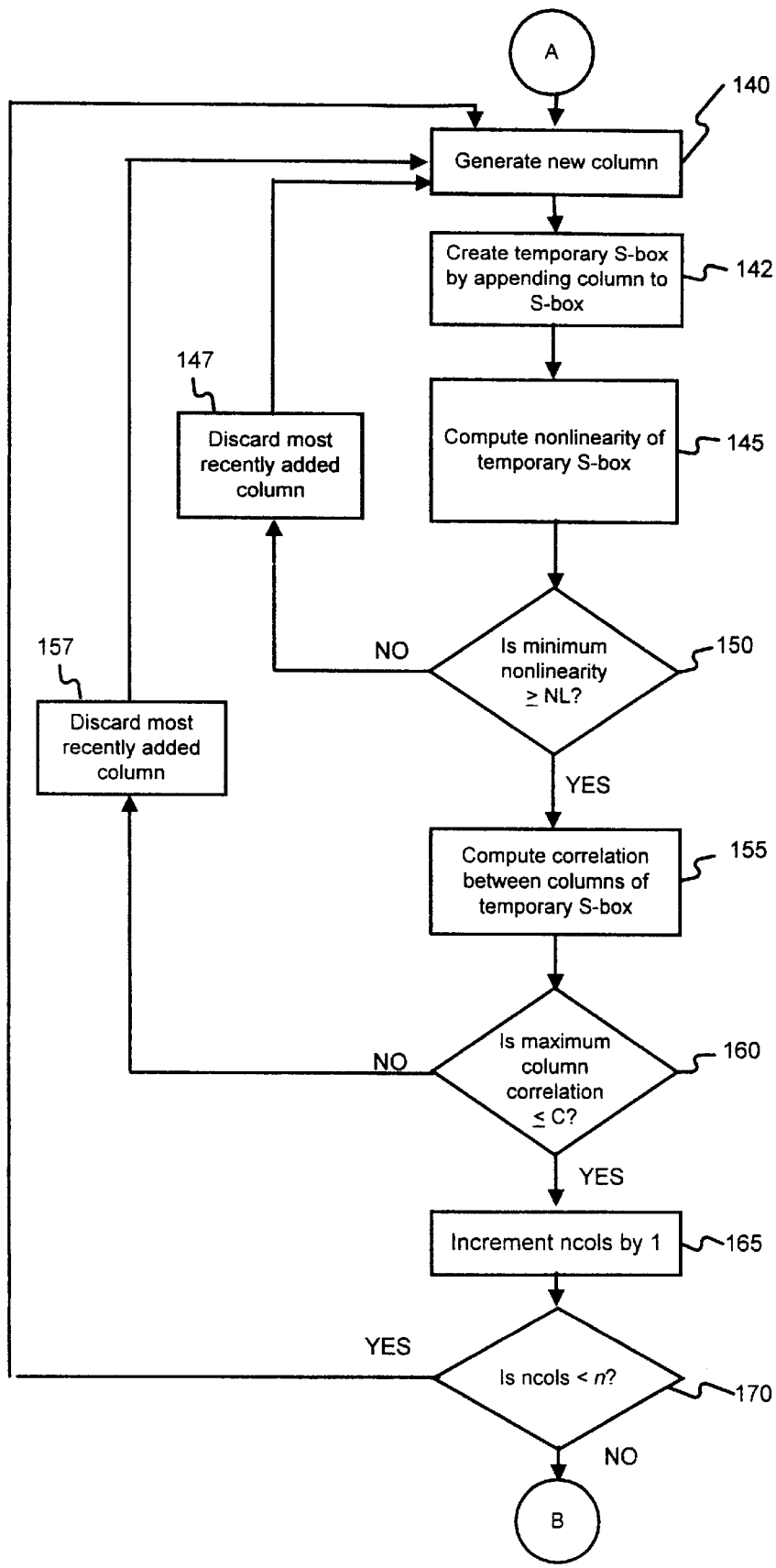
Figure 4C:
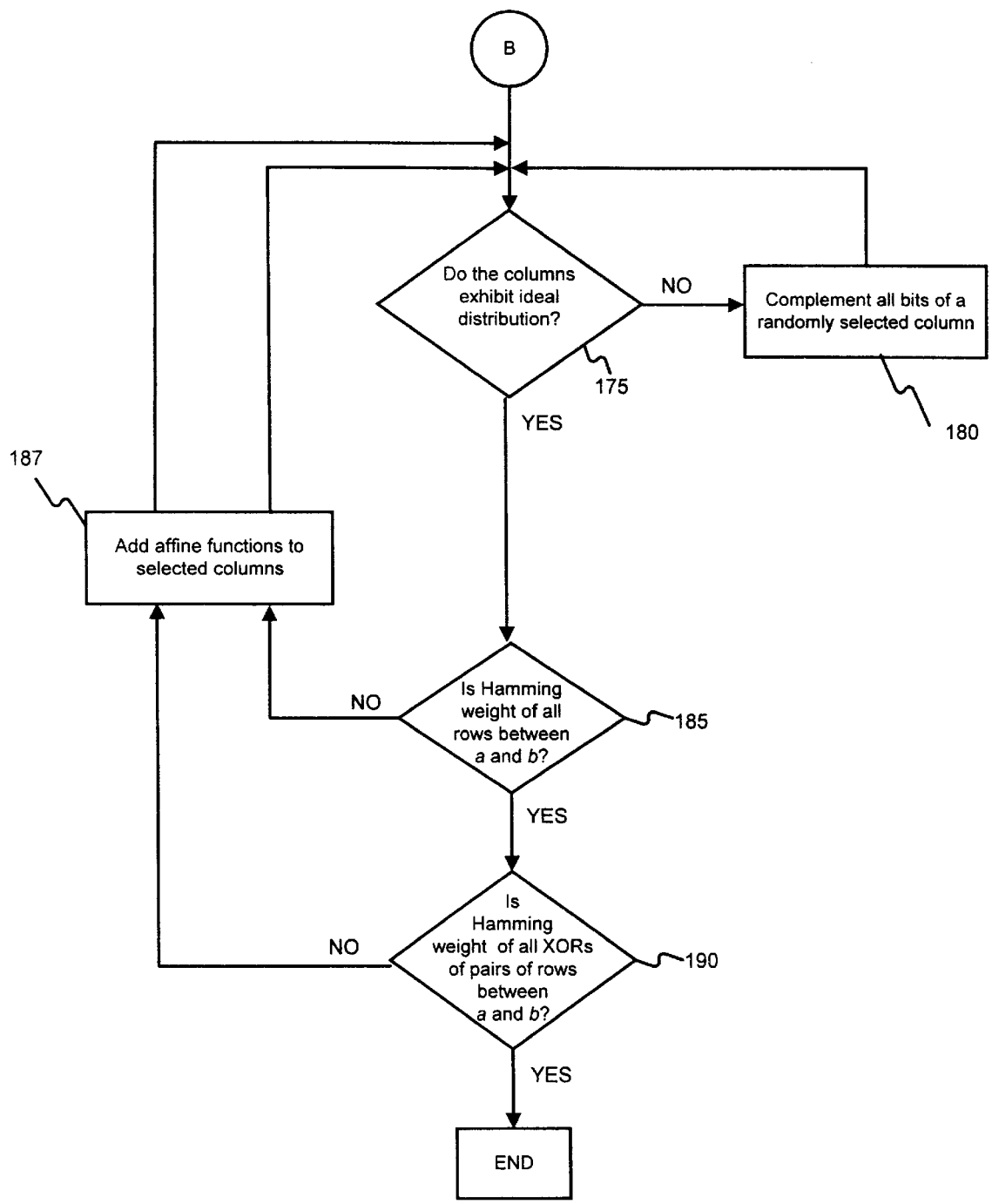

FIGS. 4A through 4C contain a flow chart illustrating a method consistent with the present invention of building an S-box. For the sake of further clarification, reference also will be made specifically to the process of constructing S-boxes with 8 inputs and 32 outputs, that is, where m=8 and n=32. This is the size of the S-boxes used in the current implementation of the CAST cipher described above.

A process consistent with the present invention for constructing an S-box with a certain number of inputs and outputs will exhibit certain ideal operational characteristics. One of the ideal characteristics may be, for example, that the Hamming weight of rows and pairs of rows approaches weight n/2. For this reason, optimal ranges for the ideal operational characteristics are chosen. Thus, minimum and maximum values (a and b, respectively) for the Hamming weight of the rows of the desired m×n S-box are chosen (Step 104). The value, a, should be somewhat less than n/2 and the value, b, should be somewhat greater than n/2. Values a and b will be used later in the procedure to determine whether the weights of the rows of the intermediate S-boxes approach the "ideal."

Next, a minimum value for the nonlinearity, NL, of the desired S-box is chosen (Step 106). This value may be any positive number; however, the strength of the algorithm generally will increase with a higher nonlinearity value. A CAST-based cipher using constructed S-boxes with nonlinearity equal to 74 generally will be more secure, that is, more resistant to cryptanalytic attack, than the same cipher using S-boxes with nonlinearity of 72. For example, 8×32 S-boxes with nonlinearity as high as 74 may be constructed using methods consistent with the present invention.

In the preferred embodiment, a maximum level of correlation between columns, C, is also chosen for the target S-box (Step 110). Using the method in FIGS. 4A–4C, 8×32 S-boxes with correlation between columns as low as 36 could be constructed.

Referring to FIGS. 4A–4C, the next step is to construct an m×k S-box with the same number of inputs but fewer outputs than the target S-box (Step 115). Generally, k must be a positive integer greater than one and less than n. Additionally, in the preferred embodiment k is chosen so that the m×k S-box is computationally easy and quick to generate and to verify. The m×k S-box may be generated using any known method but should have operational properties at least as good as those desired in the target size S-box (Step 115). The m×k S-box, for example, could be generated using a random collection of pre-stored columns. The S-box, however, should have nonlinearity at least equal to the minimum nonlinearity value, NL, and the maximum level of correlation value, C.

Once an initial S-box of ideal operational characteristics is generated, the S-box will be enlarged to the desired size by intelligently choosing additional columns that preserve, or at least do not materially deteriorate, the ideal operational characteristics. An S-box with high nonlinearity, low correlation between columns and an ideal XOR table can be modified by adding linear functions to the columns without disturbing these properties.

Enlarging the S-box involves an iterative process of generating a column and testing to see whether the new column may be added to the S-box without adversely affecting the operational characteristics. A temporary variable, ncols, is set to k (Step 135). The iterative process begins by generating a candidate column (Step 140). The candidate column may be generated using any known Boolean function; however, certain desirable operation characteristics, such as maximum order strict avalanche criteria (I3, above), will be guaranteed if bent functions are chosen for the Boolean functions. In the preferred embodiment, candidate columns are generated using Method A, which may be defined as follows:

Method A

Let a, b, c ∈ $B_6$ and let A, B, C be their respective Walsh Transforms. If $$D(w_7 \ldots w_0) = \begin{cases} A(w_5 \ldots w_0), & w_6 = 0, w_7 = 0 \\ B(w_5 \ldots w_0), & w_6 = 0, w_7 = 1 \\ C(w_5 \ldots w_0), & w_6 = 1, w_7 = 0 \\ -2^{2n}[A(w_5 \ldots w_0)B(w_5 \ldots w_0)C(w_5 \ldots w_0)]^{-1}, & w_6 = 1, w_7 = 1 \end{cases}$$

represents the Walsh transform of a function d:$\{0, 1\}^m \rightarrow \{0, 1\}$, then d is bent.

Next, a temporary S-box is constructed comprising the current S-box and the new column (Step 142). The process then determines whether the addition of the candidate column will adversely or positively affect the operational characteristics of the S-box by testing the temporary S-box for the desired operational characteristics.

To do so, the nonlinearity of the temporary S-box is computed (Step 145). Nonlinearity may be computed in any commonly known manner; however, in the embodiment of the present invention, nonlinearity is calculated as follows:

$$nl(S) = \min_{f \in C} nl(f)$$

where C is the set of all linear combinations of the columns of S and $$nl(f) = 2^{n-1} - \frac{1}{2} \max_{w \in (0, 1)^m} |W(f)(w)|.$$

The nonlinearity of the S-box is thus the minimum nonlinearity of the set of all combinations of the columns of the temporary S-box. If the nonlinearity of the temporary S-box is less than the threshold minimum the most recently added column is discarded (Step 147), and the process begins another iteration by generating a new column (Step 140).

If the nonlinearity of the temporary S-box is within acceptable parameters, the process computes the correlation between the columns of the temporary S-box (Step 155). Correlation between columns may be calculated using any known method, however, in the preferred embodiment of the present invention, correlation is calculated as follows:

$$Cor_{ij}(S) = \max_{\substack{c \in \{0, 1\}^n \\ 1 < wt(c) \le i}} DD_j(Mc)$$

where $$DD_j(f) = \max_{\substack{d \in \{0, 1\}^m \\ 1 \le wt(d) \le j}} \frac{1}{2}\left|2^{n-1} - \sum_{x=0}^{2^n-1}[f(x) \oplus f(x \oplus d)]\right|.$$

M is the binary matrix corresponding to S, and the matrix multiplication is done using modulo 2 addition.

If the correlation between columns of the temporary S-box is greater than the minimum correlation, the most recently added column is discarded (Step 157), and the process begins another iteration by generating a new column (Step 140).

If a candidate column passes both the nonlinearity and correlation between column tests, the column is kept in the temporary S-box and the number of columns in the temporary S-box is incremented by 1 (Step 165). If the number of columns in the temporary S-box is less than that desired for the target S-box, the process of generating a new column is repeated. (Step 170).

Once the temporary S-box reaches the desired size, the process may terminate but other measures may be taken to decrease the exploitability of the S-box by cryptanalytic attack further. A determination is made whether the columns exhibit ideal distribution (Step 175). As mentioned earlier, columns have ideal weight distribution if they have Hamming weight approximately equal to half their length. Columns generated using bent functions, however, will have Hamming weight either equal to $2^{n-1}-2^{n/2-1}$ or $2^{n-1}+2^{n/2-1}$. If the columns do not exhibit ideal distribution, complementing all of the bits of a randomly selected column may improve the overall distribution (Step 180).

Once the columns of the S-box are evenly distributed, the process tests the distribution of the rows of the S-box. If the Hamming weight of the rows is not between a and b, affine functions are added to selected columns. (Step 187) The nonlinearity and correlation between columns of an S-box is unaffected by the addition of linear functions to the columns; however, the distribution of the rows may be improved by this technique.

If the rows of the S-box are within acceptable parameters, the XORs of pairs of rows are also tested in this manner (Step 190). If the Hamming weight of the XORs of pairs of rows are not between a and b, affine functions are again added to selected columns (Step 187).

In the process described above, columns are simply discarded if they do not have the desired minimum nonlinearity with respect to any combination of columns already in the S-box. An alternative to this method is the construction method described below and depicted in FIG. 5.

Figure 5:
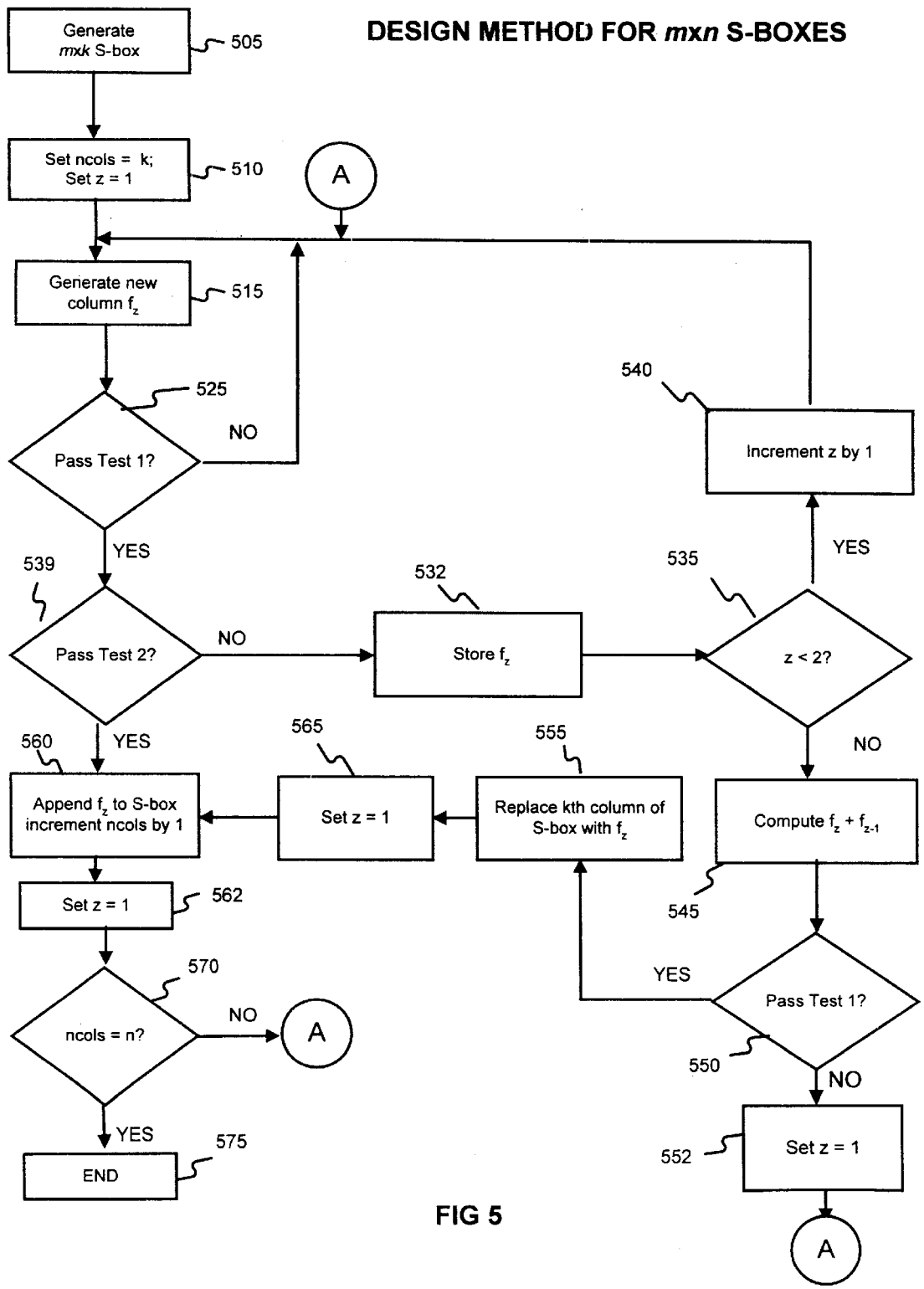
FIG. 5 is a flow chart of an alternative method of constructing m×n S-boxes.

In FIG. 5, the construction process begins by generating an S-box having m inputs and k inputs, wherein k is somewhat smaller than n, the number of outputs of the desired S-box (Step 505). The S-box may be generated in any manner, however, as in the first embodiment, the initial S-box should be chosen to exhibit the desired operational characteristics. Temporary variables, ncols and z, are initialized (Step 510). Variable ncols will denote the number of columns in the current S-box. The variable z will indicate the number of candidate columns temporarily set aside.

The iterative process begins by generating a candidate column, $f_z$ (Step 515). Column $f_z$ is tested first using Test 1 (Step 525). In the example shown in FIG. 5, Test 1 is performed by computing the minimum nonlinearity of all combinations of k−1 columns of the S-box. Any subset of k−1 columns may be used in Test 1, but for this example and ease of notation, it is assumed that the kth column is the column not used in the calculation. Column $f_z$ "passes" Test 1 if the minimum nonlinearity of all of the combinations exceeds a minimum threshold. For example, if, as in the example described above, the target S-box will have 8 inputs and 32 outputs, the minimum threshold for nonlinearity may be set to 74.

If column $f_z$ fails Test 1, the column is discarded and the process generates a new column (Step 515). If column $f_z$ passes Test 1, however, the column is tested using Test 2 (Step 530). In Test 2, the candidate column is tested for nonlinearity with respect to all combinations of columns involving the column not used in Test 1 which, in this example, is column k. Column $f_z$ "passes" Test 2 if the minimum nonlinearity of all of the combinations exceeds a minimum threshold.

If column $f_z$ passes Test 2, the column is appended to the S-box, z is set to 1 (Step 562), and variable ncols is incremented by 1 (Step 560). The process determines whether the number of columns in the current S-box is equal to the target size (Step 570). If so, the process ends (Step 575). If not, the iterative process begins again by generating a new column $f_z$ (Step 515).

If column $f_z$ fails Test 2, the candidate column is stored rather than discarded (Step 532). A determination is made whether $f_z$ is the first stored column (Step 535). If $f_z$ is the first stored column, variable z is incremented by 1 (Step 540) and the process continues by generating a new column (Step 515).

If $f_z$ is the second column to pass Test 1 but fail Test 2, the first and second columns are XORed together (Step 545). The result, $f_z \oplus f_{z-1}$ is tested for nonlinearity using Test 1 (Step 550). Verifying that $f_z \oplus f_{z-1}$ passes Test 1 involves only half the computation effort required to verify that a new candidate column passes both Tests 1 and 2 and, therefore, will typically decrease the time required to find columns for large S-boxes. If $f_z \oplus f_{z-1}$ passes Test 1, $f_z$ replaces the kth column of the current S-box (Step 555). The variable z is reset to 1 (Step 565). The column $f_z = f_1$, is appended to the S-box and the number of columns, ncols, is incremented by 1 (Step 570). If $f_z \oplus f_{z-1}$ fails Test 1, the variable z is reset to 1 (Step 552) and the process generates a new candidate column.

This method could also be extended in any one of several different ways. For example, the process could save three or more columns that pass Test 1 but fail Test 2. Also, the process may be modified so that any two or more of the Test 2 failures may be XOR'd together to produce a new candidate column.

Figure 6:
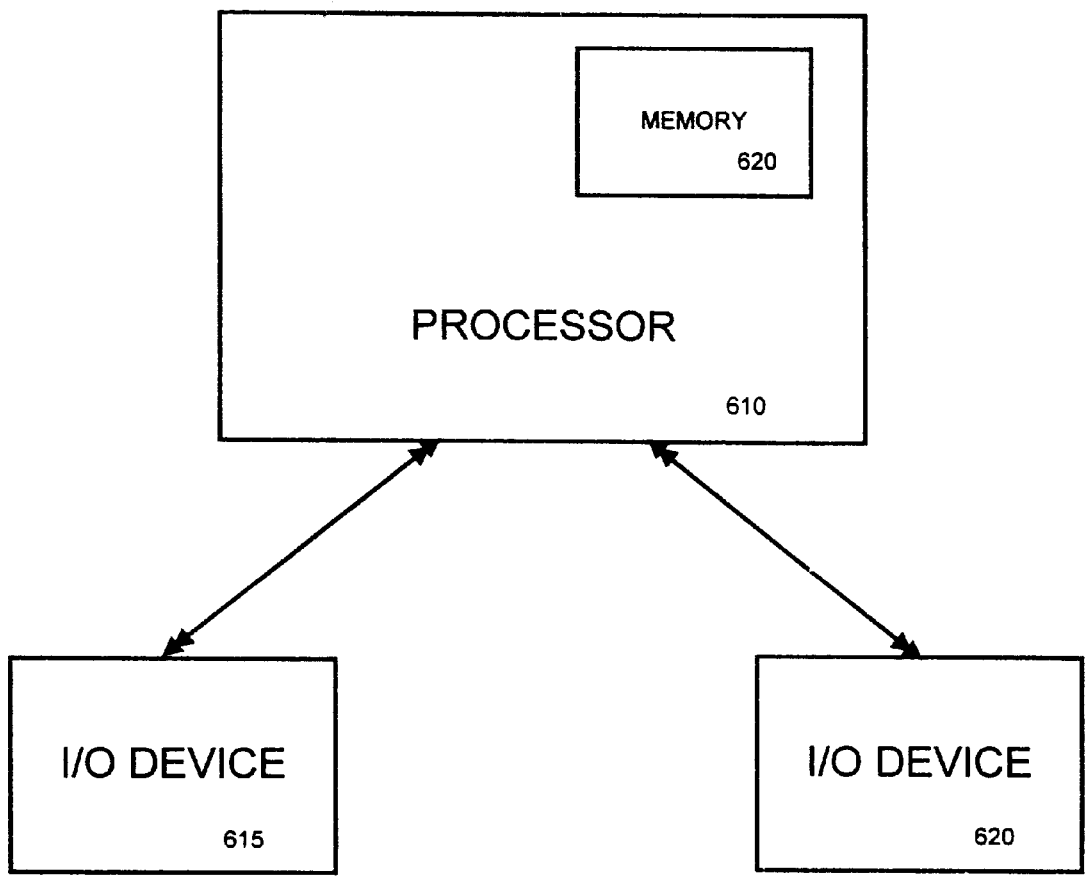
FIG. 6 shows a system for carrying out the method consistent with the present invention.

FIG. 6 illustrates a system consistent with the present invention. As shown in FIG. 6, the present invention uses a processor 610 connected to one or more input/output (I/O) devices (615 and 620) via data links 602 and 604. In general, I/O devices 615 and 620 can be any devices that are capable of passing information to or receiving data from processor 610. By way of example only, I/O devices 615 and 620 may be monitors, keyboards, modems, printers, display devices or workstations. Each workstation can be a personal computer (PC) or other hardware that includes a visual display device and data entry device such as a keyboard or mouse. It should further be understood that FIG. 6 describes an exemplary network where each of the hardware components may be implemented by conventional, commercially available computer systems.

It will be apparent to those skilled in the art that various modifications and variations can be made in the methods and systems of the present invention without departing from the spirit or scope of the invention. For example, in addition to the tests for nonlinearity and correlation between columns disclosed other tests may be performed that are functionally equivalent. The true scope of the claims is defined by the following claims.

What is claimed is:

1. A method of ciphering digital data through use of a substitution box (S-box) capable of receiving m inputs and producing n outputs, where m and n are positive integers greater than 1, comprising the steps of:
   (a) generating the S-box by:
      (i) selecting desired operational characteristics for the S-box;
      (ii) generating a first S-box having m inputs and having k outputs, wherein k is less than n and greater than 1;
      (iii) generating a column corresponding to a Boolean function of m inputs;
      (iv) determining the operational characteristics of a temporary S-box formed by the first S-box and the column;

(v) modifying the first S-box by appending the column, if the temporary S-box possesses the desired operational characteristics;

(vi) repeating steps (iii) through (v) until the first S-box has n outputs; and subsequently (b) ciphering digital data using the first S-box having the n outputs.

2. A method according to claim 1, further including the steps of:

selecting a desired level nonlinearity, NL, for the S-box;

determining the nonlinearity of a temporary S-box formed by the first S-box and the column; and modifying the first S-box by appending the column, if the nonlinearity of the temporary S-box is equal to or greater than NL.

3. A method according to claim 1, further including the steps of:

selecting a desired level of correlation between columns, C, for the S-box;

determining the correlation between columns of the temporary S-box formed by the first S-box and the column; and modifying the first S-box by appending the column, if the correlation between columns of the temporary S-box is equal to or less than C.

4. A method according to claim 3, further including the steps of:

selecting a desired level nonlinearity, NL, for the S-box;

determining the nonlinearity of a temporary S-box formed by the first S-box and the column; and modifying the first S-box by appending the column, if the nonlinearity of the temporary S-box is equal to or greater than NL.

5. A method according to claim 2, wherein the step of determining the nonlinearity further comprises the steps of:

determining the nonlinearity for each combination of columns of the temporary S-box; and setting the nonlinearity of the temporary S-box equal to the minimum nonlinearity of the combinations.

6. A method according to claim 3, wherein the step of determining the level of correlation between columns further comprises the steps of:

determining the correlation for each combination of columns of the temporary S-box; and, setting the level of correlation between columns of the temporary S-box equal to the maximum correlation of the set of combinations.

7. A method according to claim 1, further comprising the step of:

determining the average Hamming weight of the columns of the m×n S-box; and complementing all the bits of randomly selected columns until the columns of the S-box have average Hamming weight approximately $2^{n-1}$.

8. A method according to claim 1, wherein the step of generating a first S-box includes the step of generating the first S-box using bent functions.

9. A method according to claim 1, wherein the step of generating a column includes the step of generating the column using bent functions.

10. A method according to claim 9, wherein the step of generating a first S-box includes the step of generating the first S-box using bent functions.

11. A method according to claim 10, further comprising the step of:

complementing all the bits of randomly selected columns of the S-box until half the columns of the S-box have Hamming weight equal to $2^{n-1}-2^{n/2-1}$ and half the columns have Hamming weight equal to $2^{n-1}+2^{n/2-1}$.

12. A method according to claim 1, further comprising the steps of:

selecting a minimum Hamming weight, a, for the rows of the S-box;

selecting a maximum Hamming weight, b, for the rows of the S-box; and adding affine functions to the columns of the S-box until the weight of each row of the S-box is between a and b inclusive.

13. A method according to claim 12, further comprising the step of:

adding affine functions to the columns of the S-box until the weight of each XOR of pairs of rows is between a and b inclusive.

14. A method according to claim 1, further comprising the steps of:

(a) selecting a minimum Hamming weight, a, for the rows of the S-box;

(b) selecting a maximum Hamming weight, b, for the rows of the S-box;

(c) adding affine functions to the columns of the S-box until the weight of each row of the S-box is between a and b inclusive;

(d) adding affine functions to the columns of the S-box until the weight of each XOR of pairs of rows is between a and b inclusive; and (e) repeating steps (c) through (d) until the weight of each row of the S-box and the weight of each XOR of pairs of rows of the S-box are between a and b inclusive.

15. A method according to claim 1, wherein the step of generating a first S-box further includes the step of generating a column using the bent function, d(x), such that $d: \{0, 1\}^m \to \{0, 1\}$ and $$D(w_7 \ldots w_0) = \begin{cases} A(w_5 \ldots w_0), & w_6 = 0, w_7 = 0 \\ B(w_5 \ldots w_0), & w_6 = 0, w_7 = 1 \\ C(w_5 \ldots w_0), & w_6 = 1, w_7 = 0 \\ -2^{2n}[A(w_5 \ldots W_0)B(w_5 \ldots w_0)C(w_5 \ldots w_0)]^{-1}, & w_6 = 1, w_7 = 1 \end{cases}$$

represents the Walsh transform of the function where a, b, c $\in B_6$ and A, B, C are their respective Walsh Transforms.

16. A method according to claim 15, wherein the step of generating a column further includes the step of generating a column using the bent function, $f(x)$, where f is the mapping $f: \{0, 1\}^m \to \{0, 1\}$ and f(x) may be further defined as:

$$f(x) = \frac{1}{2}\left(1 + \frac{1}{2^{n/2}} \sum_{w \in (0,1)^m} (-1)^{w \cdot x \oplus d(x)}\right).$$

17. A method according to claim 2, wherein the step of determining nonlinearity of an S-box includes the step of determining the nonlinearity as:

$$nl(S) = \min_{f \in C} nl(f)$$

where C is the set of all linear combinations of the columns of S and $$nl(f) = 2^{n-1} - \frac{1}{2} \max_{w \in (0,1)^m} |W(f)(w)|.$$

18. A method of ciphering digital data through use of an m×n substitution box (S-box), where m and n are positive integers greater than 1, comprising the steps of:

(a) generating the S-box by:
  (i) selecting a desired level nonlinearity, NL, for the m×n S-box;
  (ii) generating a fist S-box having m inputs and k outputs, wherein k is less than n and greater than 1;
  (iii) generating a first column, $C_1$, of length m;
  (iv) performing a first operational test using column $C_1$;
  (v) performing a second operational test using column $C_1$;
  (vi) generating a second column, $C_2$, of length m;
  (vii) performing the first operational test using column $C_2$;
  (viii) performing the second operational test using column $C_2$;
  (ix) determining $X_1$, the XOR of $C_1$ and $C_2$ if $C_1$ and $C_2$ both pass the first operational test and fail the second operational test;
  (x) performing the first operational test using $X_1$;
  (xi) replacing the kth column of the first S-box with $C_1$ and appending $C_2$ to the first S-box as the $k+1^{st}$ column, i $X_1$ passes the first operational test;
  (xii) incrementing k by 1;
  (xiii) repeating steps (iii) through (xii) until k equals n; and (b) ciphering digital data using an S-box having m inputs and k outputs where k=n.

19. A method according to claim 18, wherein the step of performing a first operational test further includes the step of:
determining the minimum nonlinearity of the set containing all combinations of k-1 columns of the first S-box and the column.

20. A method according to claim 18, wherein the step of performing a second operational test further includes the step of:
determining the minimum nonlinearity of the set containing all combinations of the columns of the first S-box that include the column omitted in the first operational test and the column.

21. A system for ciphering digital data using a substitution box (S-box) capable of receiving m inputs and producing n outputs, where m and n are positive integers greater than 1, comprising:
means for generating the S-box including:
  means for selecting desired operational characteristics;
  means for generating a first S-box having m inputs and having k outputs, wherein k is less than n and greater than 1;
  means for generating a column corresponding to a Boolean function of m inputs;
  means for determining the operational characteristics of a temporary S-box formed by the first S-box and the column;
  means for modifying the first S-box by appending the column, if the temporary S-box possesses the desired operational characteristics; and
means for ciphering digital data using a modified first S-box.

22. A system for ciphering digital data using a substitution box (S-box) capable of receiving m inputs and producing n outputs, where m and n are positive integers greater than 1, comprising:
means for generating the S-box including:
  means for selecting a desired level nonlinearity, NL, for the X-box;
  means for generating a first S-box having nonlinearity equal to or greater than NL;
  means for generating a column corresponding to a Boolean function of m inputs;
  means for determining the nonlinearity of a temporary S-box formed by the first S-box and the column;
  means for modifying the first S-box by appending the column, if the nonlinearity of the temporary S-box is equal to or greater than NL; and
means for ciphering digital data using a modified first S-box.

23. A system according to claim 22, further comprising:
means for selecting a desired level of correlation between columns, C, for the S-box;
means for determining the correlation between columns of the temporary S-box formed by the first S-box and the column; and
means for modifying the first S-box by appending the column, if the correlation between columns of the temporary S-box is equal to or less than C.

24. A system according to claim 22, further comprising:
means for determining the average Hamming weight of the columns of the m×n S-box; and
means for complementing all the bits of randomly selected columns until the columns of the S-box have average Hamming weight approximately $2^{n-1}$.

25. A system for ciphering digital data using an m×n substitution box (S-box), where m and n are positive integers greater than 1, comprising:
means for generating the S-box including:
  means for selecting a desired level nonlinearity, NL, for the m×n S-box;
  means for generating a first S-box having m inputs and k outputs, wherein k is less than n and greater than 1;
  means for generating columns, $C_1$ and $C_2$;
  means for performing a first operational test;
  means for performing a second operational test;
  means for determining the XOR $X_1$ of the two columns $C_1$ and $C_2$;
  means for replacing the kth column of the first S-box with $C_1$ and appending $C_2$ to the first S-box as the k+1 column, if $X_1$ passes the first operational test and if both $C_1$ and $C_2$ and pass the first operational test and fail the second operational test; and
means for ciphering digital data using an S-box resultant from the means for replacing.

26. A system according to claim 25, wherein the step of performing a first operational test further includes the step of:
determining the minimum nonlinearity of the set containing all combinations of k-1 columns of the first S-box and the column.

27. A system according to claim 24, wherein the step of performing a second operational test further includes the step of:
determining the minimum nonlinearity of the set containing all combinations of the columns of the first S-box that include the column omitted in the first operational test and the column.

* * * * *